Dec. 12, 1939.   F. F. KORS   2,182,967
COLLAPSIBLE AUTO TRAILER
Filed Aug. 27, 1937   4 Sheets-Sheet 1
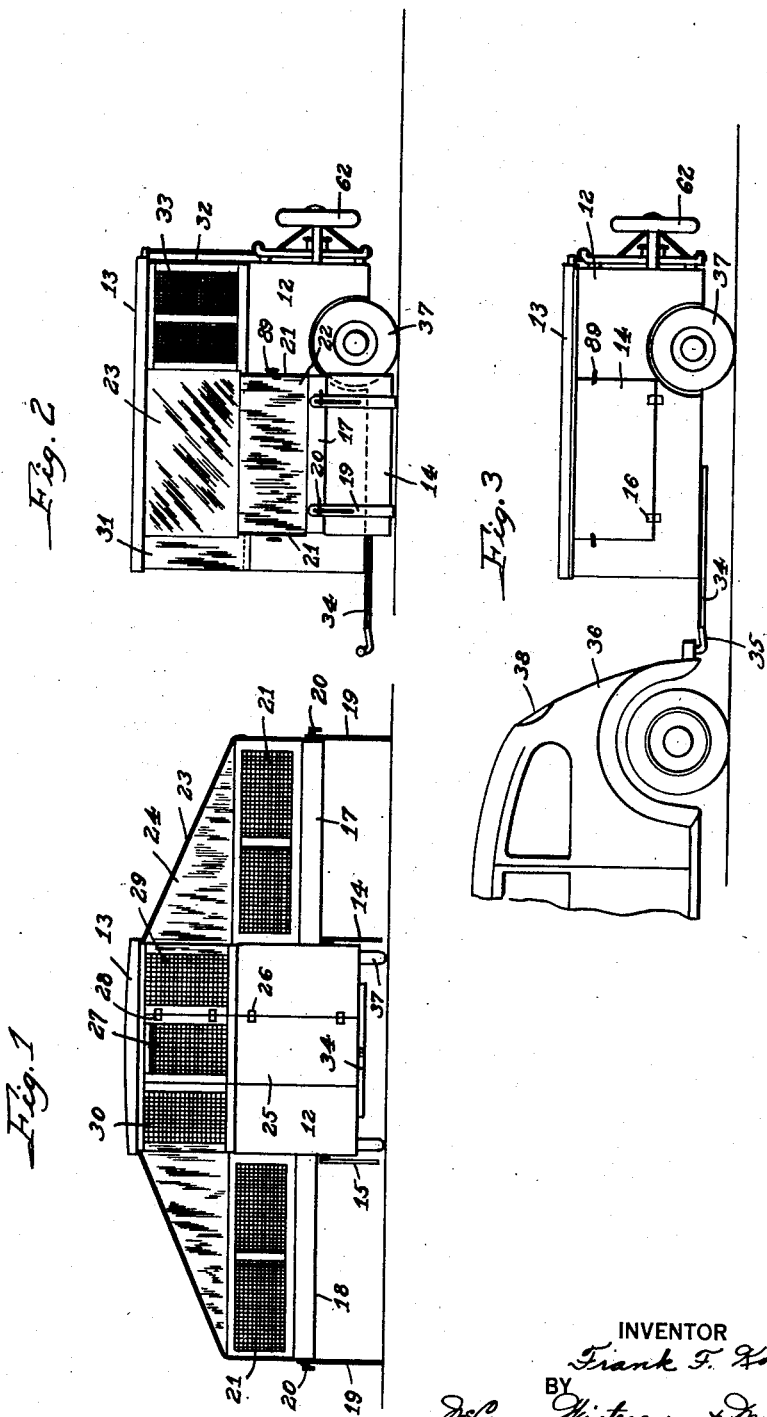
INVENTOR
Frank F. Kors
BY
McCanna, Wintercorn & Morsbach
ATTORNEYS

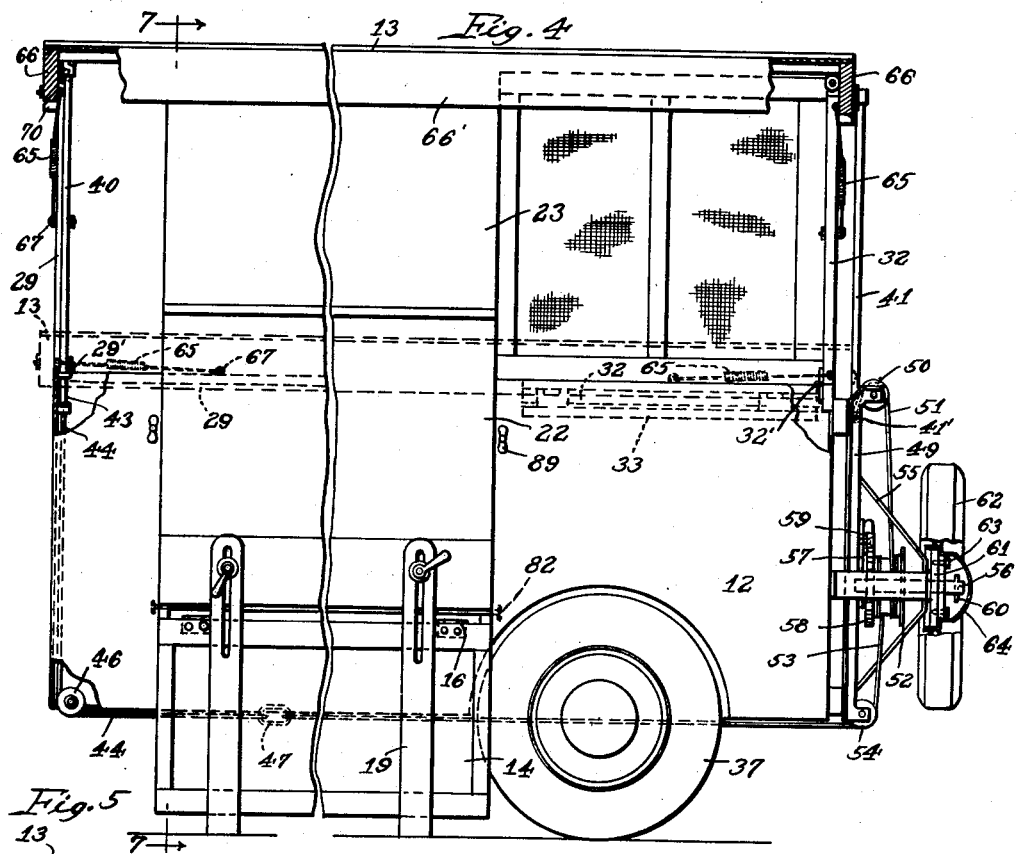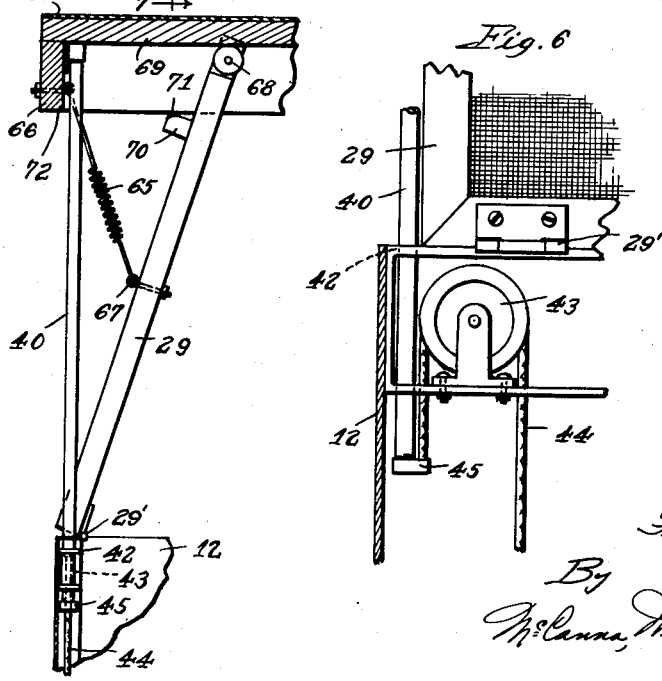

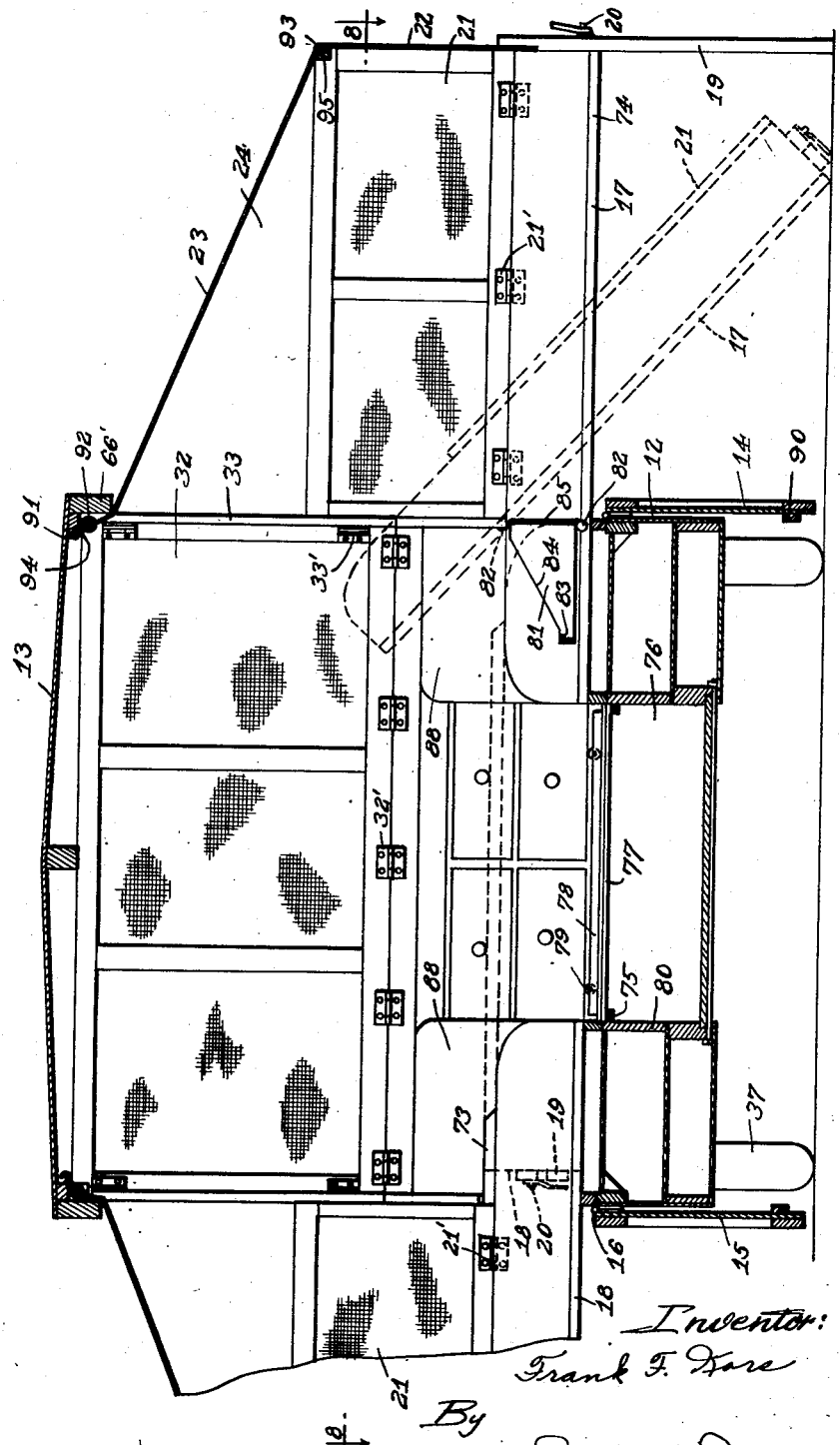

Dec. 12, 1939.　　　　F. F. KORS　　　2,182,967
COLLAPSIBLE AUTO TRAILER
Filed Aug. 27, 1937　　　　4 Sheets-Sheet 4
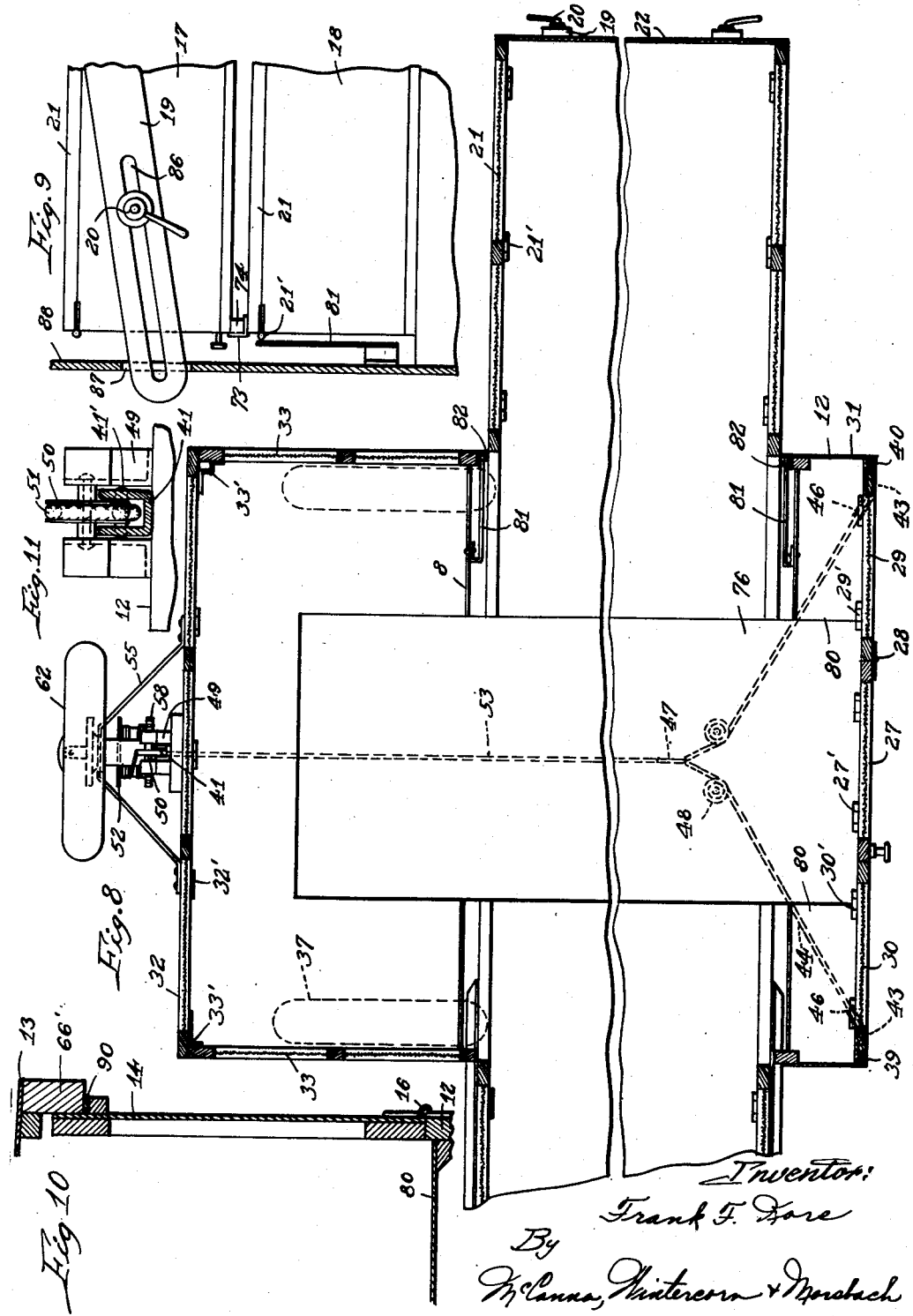

Patented Dec. 12, 1939

2,182,967

UNITED STATES PATENT OFFICE 2,182,967

COLLAPSIBLE AUTO TRAILER

Frank F. Kors, Independence, Kans.

Application August 27, 1937, Serial No. 161,212

19 Claims. (Cl. 296—23)

This invention relates to house-type trailers for automobiles and is more particularly concerned with collapsible or foldable trailers of that type which, as is well known, have the advantage of better roadability by reason of the low center of gravity of the unit in its folded condition ready for the road, and the further advantage of unobstructed rear vision over the trailer from the car to which it is coupled.

The principal object of my invention is to provide a trailer of the kind mentioned having a top raisable from a low position directly over the body to house-type trailer height by means of vertically movable posts actuated by cables wound upon a single manually rotatable drum, the top being resiliently connected wtih hinged side and end members so as to raise these into upright position simultaneously with the raising of the top, whereby to enable setting up the trailer for use in the shortest possible time while permitting the operation to be performed conveniently by one person if necessary. A novel feature in connection wth the cable drum is the mounting of the spare wheel and tire thereon so that the drum serves as a carrier and the spare wheel and tire serve as a convenient crank means for turning the drum, making it unnecessary to use a crank for that purpose.

Another important object of my invention is to provide a trailer of the kind mentioned, the top of which can be elevated to the required height from the floor and the opposite sides of which can be opened and beds extended therefrom, protected by canopies or awnings reaching from the outer ends of the beds to the raised top, whereby to accommodate four persons comfortably, even though the trailer when folded is of relatively small size.

Special features incorporated in the carrying out of the above object are:

1. The provision of hinged side enclosures foldable downwardly on top of both bed frames, and angle iron guides on one set of these enclosures and runners on the bottom of the other bed frame arranged to slide on said guides, whereby to permit placing the two beds crosswise or lengthwise in the trailer on top of one another, means being provided for conveniently elevating the inner end of one bed frame relative to the other so as to permit moving the one to retracted position in the trailer and then sliding the other on top of it;

2. The provision of foldable legs or props on the outer ends of the two bed frames arranged to be swung down to the ground to support the outer ends of the beds in extended position, and also arranged to be folded into the planes of the beds in their retracted positions and interlocked with the body of the trailer to retain the beds in position so that they will not drift and come into contact with the side doors that are closed next to the beds, and 3. The provision of depending side members on the top to overlap the outside of the body and the upper edges of the side doors when swung upwardly to closed position, whereby to securely lock the doors and at the same time seal the trailer body against ingress of dust and water while the trailer is on the road.

These and other objects of the invention will appear in the following detailed description in which reference is made to the accompanying drawings wherein—

Figures 1 and 2 are a front and side view, respectively, of a trailer made in accordance with my invention as it appears when set up for use;

Fig. 3 is a side view of the trailer as it appears when collapsed or folded, ready for the road, the same being shown coupled to the rear end of an automobile;

Fig. 4 is a view partly in side elevation and partly in vertical section of the trailer set up for use, an intermediate portion of the length thereof being broken away through the bed section in order to permit showing the parts on a larger scale;

Figs. 5 and 6 are enlarged sectional details illustrating the top elevating means, Fig. 5 showing the resilient connection between the top and the hinged upper end members to which are also hinged the upper side members;

Fig. 7 is a vertical cross-section on the line 7—7 of Fig. 4;

Fig. 8 is a horizontal section on the line 8—8 of Fig. 7;

Figs. 9 and 10 are sectional details, Fig. 9 showing the locking of the bed frames to the body in retracted position, and Fig. 10 showing the overlapping of the top with the sides of the body and upper edges of the side doors, and Fig. 11 is an enlarged sectional detail of a portion of Fig. 8.

The same reference numerals are applied to corresponding parts throughout the views.

Referring first briefly to Figs. 1-2, 12 designates the trailer body and 13 its raisable top which forms a protective covering for the trailer body and contents besides helping to keep the side doors 14 and 15 locked in closed position. The latter are hinged at their lower edges, as at 16, to swing downwardly as shown in Figs. 1 and 2 to permit extension of bed frames 17 and 18 from opposite sides of the trailer. A pair of props 19 clamped as at 20 to the outer end of each bed frame serve to support the same while the inner ends are, of course, supported on the trailer body. While I have shown the beds stored crosswise in the trailer and extensible lengthwise, it should be understood they may be stored lengthwise in the trailer and extended sidewise to operative position. There are hinged side enclosures 21 on opposite sides of each bed frame which can be raised to vertical position as appears in Figs. 1 and 2, and awnings provide end closures 22, inclined tops 23, and triangular-shaped sides 24 to complete enclosures around three sides of the two bed frames, the fourth side being, of course, open to the interior of the trailer. The closures 21 are screened and are usually equipped with awnings or drop curtains for covering the outside or inside thereof. They are not shown but are arranged to be rolled up or supported on poles or the like in a well known manner. A door 25 hinged, as at 26, is provided in the middle of the front end of the trailer body 12, but may be on the rear end instead. An upper section 27 is suitably hinged at 27' at its lower edge to the upper edge of the door 25 and also, as at 28, to an end closure 29 which in turn is hinged at its lower edge to the upper edge of the trailer body to swing upwardly into position under the top 13 when the latter is raised, as in Figs. 1 and 2. Another end closure 30 similar to the closure 29 is provided on the other side of the door and hinged at 30' to swing upwardly into position under the top. Narrow side pieces of canvas 31 suitably sewed to the inner edges of the pieces 24 close the spaces on both sides between the top 13 and trailer body 12 at the door end. A single end closure 32 on the opposite end of the trailer body 12 is hinged at its lower edge to swing up into position under the raised top 13 and extends the full width of the trailer and has side sections 33 hinged to its lateral edges to be swung into positions at right angles to the end closure 32 to close the spaces on opposite sides of the trailer at this end between the raised top 13 and the trailer body 12, as indicated in Fig. 2. The hitch bracket 34 on the bottom of the front end of the trailer serves as a convenient step when the door 25—27 is on the front end, and carries on its outer end a part to make detachable connection with the coupler 35 on the rear end of the automobile 36, thereby supporting the front end of the trailer in elevated relation to the road while the rear end is supported by the wheels 37. A suitable jack (not shown) provides support for the front end of the trailer when uncoupled or, if desired, four props like the ones 19 may be lowered from the four corners of the trailer body 12 to engage the ground and provide a steady rest so that the trailer will not be wabbly.

It should be apparent from this much description that the collapsible trailer of my invention when folded and closed up ready for the road will be low enough in relation to the rear window 38 of the car ahead to afford unobstructed rear vision, which, of course, is quite an advantage from the safety standpoint. Moreover, the collapsed or folded trailer has such a low center of gravity that there is no danger of side sway as with the regular non-collapsible house-type trailers in going around sharp curves at high speeds. The ordinary hazards attached to traveling with trailers are, therefore, considerably reduced with a trailer of this design and construction. Of course, it is realized that a trailer of the non-collapsible type has the advantage of instant readiness for use when parked at a camp site. However, the trailer of my invention, as will soon appear, is so constructed and designed that the unfolding and setting up for use should not take more than a few minutes, once the owner has become familiar with the routine, and, furthermore, the operating mechanism provided in connection with the raisable top and hinged side and end enclosures as well as the features provided in connection with the extensible bed frames to facilitate operation thereof, make it entirely feasible for one person to set up the trailer completely or fold it up ready for the road. The increased safety in operation of this type of trailer and generally its better roadability coupled with decreased weight are considered as more than offsetting the slight disadvantage of having to set it up and fold it again each time the trailer is used. Then too, it goes without saying that since the trailer body proper is a small fraction of the size of the conventional house-type trailer body and the foldable extension pieces to complete the enlarged closure to house-type trailer height can be of light, cheap construction, a trailer of the present type may be manufactured at much lower cost and be accordingly available to a much larger number of prospects than the rigid non-collapsible house-type trailers. In this connection it is not out of place to mention that the laws which regulate trailers in various states and the operation of trailer camps are barring the use of toilet and bath facilities in trailers so that the house-type trailer, stripped of those facilities provides nothing more than eating and sleeping accommodations. The present type of trailer is, therefore, pretty much on a par with these others, since it provides good sleeping accommodations for four persons and room enough inside for the preparation and consumption of food.

The top 13, as shown in Figs. 4 and 8, has three vertically movable posts 39, 40 and 41 secured thereto at opposite ends thereof for elevating the same with reference to the trailer body 12. The posts 39 and 40 are at one end on opposite sides of the door and are slidable in guides 42 in the upper corners of the trailer body 12 adjacent pulleys 43 over which the opposite ends of a rope or cable 44 are extended and connected to the lower ends of the posts 39, as at 45. The ends of the cable 44 extend downwardly from the pulleys 43 in the corners of the body 12 and out through the bottom where they engage pulleys 46 in the corners thereof. A ring 47 is provided on the cable 44 at the middle where the cable extends rearwardly between two closely spaced pulleys 48 mounted on the bottom of the trailer body. The post 41 is a channel iron attached to the middle of the opposite end of the top 13 from the door. This channel extends downwardly between a pair of spaced angle iron guides 49 attached to the end of the trailer body 12. A pulley 50 supported between the upper ends of these guides has a rope or cable 51 extending over the top thereof and connected to the lower end of the post 41, as at 41'. This cable 51 extends downwardly from the pulley 50 on one side of a drum 52 on which it is wound, as indicated. Another rope or cable 53 is wound on the same drum but extends from the opposite side thereof and downwardly over a pulley 54 mounted between the lower ends of the guides 49 from which point it extends along the bottom of the trailer body for connection at its front end to the ring 47 previously mentioned.

Now, a bracket 55 is attached to the same end of the body 12 with the angle irons 49 and supports the outer end of the shaft 56 on which the drum 52 is rigidly secured. The shaft 56 has its inner end bearing in a plate 57 welded or otherwise suitably secured to the angle iron guides 49. A ratchet wheel 58 turning with the drum cooperates with a pawl 59 pivotally mounted on the plate 57 whereby to detachably lock the drum 52 in adjusted position. A cross-pin 60 on the outer end of the shaft 56 provides a place for detachably connecting a winding crank for turning the drum by hand. The shaft 56 and cross-pin 60 will preferably be of such a size that the motorist can use the automobile engine crank, so that no extra crank need be carried. However, it will be noticed that a large disk 61 is secured to the shaft 56 and has studs thereon similar to what are provided on a spare wheel carrier bracket and that a spare wheel and tire indicated at 62 is arranged to be clamped to the disk 61 as at 63. The removable hub cap 64 on the wheel covers up the clamping nuts 63 as well as the cross-pin 60 for the sake of good appearance as well as to discourage tampering. Since the wheel is mounted on the shaft 56, it is apparent that one may use the wheel instead of a crank for turning the drum 52. From this description it should be clear that as the drum 52 is turned the cables 51 and 53 are wound up simultaneously and cause simultaneous elevation of the posts 39—41 to raise the opposite ends of the top 13 at the same rate. When the top 13 is high enough the drum 52 can be locked by means of the pawl 59 and ratchet wheel 58. When the top is to be lowered again, the pawl 59 can be disengaged from the ratchet and the top will descend under its own weight, that being sufficient to overcome the resistance to turning of the drum to pay out the two cables.

In accordance with the present invention, as the top 13 is raised, the three end closures 29, 30, and 32, which are hinged to the ends of the trailer body 12, as at 29', 30' and 32', respectively, are arranged to be raised simultaneously toward upright operative position by virtue of resilient connections between the top 13 and these hinged members. The resilient connection in each instance consists simply of an elongated coiled spring 65 attached at one end to the depending strips 66 provided on the opposite ends of the top 13, while the other end of each spring is connected to the associated hinged member approximately midway between the upper and lower edges thereof. There will, of course, preferably be two such springs 65 adjacent the two lateral edges of each of the members 29 and 30, and at least two such springs at the opposite ends of the member 32. Now, as indicated in Fig. 5, when the top 13 has been raised almost as far as it should go, the hinged members 29, 30 and 32 will be nearly but not quite upright. Rollers 68 on the upper ends of these hinged members will be in engagement with track surfaces 69 provided on the under side of the top 13. It will, therefore, require very little effort to move the hinged members the rest of the way, because of the anti-friction roller bearings between the upper ends of these hinged members and the top 13, and the top will, of course, be raised slightly as these members are moved toward vertical positions. Cross strips 70 on the outer side of the hinged members 29, 30 and 32 near their upper ends are arranged to ride under the strips 66 and raise the top 13 slightly, just enough to be clear off the rollers 68, whereby to relieve the rollers of the weight and at the same time make for a more rigid support of the top, by virtue of the solid bearing of the strips 66 on the strips 70. It will be noticed that the leading edge 71 on the strips 70 are rounded and the meeting edge 72 on the strips 66 are likewise rounded. This facilitates the wedging action so that the strips 70 can be forced under the strips 66 fairly easily. It is, therefore, apparent that as the top 13 is raised the hinged end closures 29, 30, and 32 are raised with it nearly to vertical position. Then the operator, leaving the drum 52 locked by the pawl 59 and ratchet wheel 58, goes first to one end and shoves the hinged members 29 and 30 up to vertical operative position, and then goes to the other end and shoves the member 32 into vertical operative position, thereby supporting the top 13 partly by the members 29, 30 and 32 and partly by means of posts 39, 40 and 41. Once the end closures 29, 30 and 32 are in vertical position the side closures 33 hinged to the lateral edges of the closure 32 on vertical axes as at 33' can, of course, be swung into operative position and suitably secured to the sides of the trailer body. Later, when the trailer is to be collapsed or folded and made ready for the road again, the first thing the operator does is to fold the side closures 33 back against the end closure 32, after which the end closures 27, 29, 30 and 32 can be shoved inwardly to approximately the angle shown in Fig. 5 and the drum 52 is unlocked and the top 13 allowed to descend at the same time that the hinged members 27, 29, 30 and 32 descend to horizontal folded positions. The hinged members, of course, add considerable to the weight of the top 13 assisting its gravitation to lowered position over the trailer body. Fig. 4 illustrates in dotted lines how the hinged members 29, 30 and 32 appear in relation to the top 13 in lowered position with the springs 65 interconnecting the top and said hinged members. These springs 65 stay under approximately constant tension in the raising and lowering of the top 13. It should be apparent from the description that one person can easily attend to the raising and lowering of the top, and that since the hinged end and side closures are raised from folded position simultaneously with the raising of the top, the operation is greatly simplified and takes much less time than would otherwise be required.

The bed frames 17 and 18 are suitably of hollow wooden construction for lightness and cheapness and they have the side closures 21 hinged thereto as at 21' to fold downwardly and inwardly over the top of the bedding placed in these frames. These side closures are shown folded in such relation to the frames in Fig. 9. The two frames are of substantially the same length, both being arranged to reach from side to side in the trailer body when stacked therein on top of one another in the manner illustrated in Fig. 9. The side closures 21 on the bed frame 18 have angle iron guides 73 provided on the outer side thereof at the hinged edges so that when these closures are folded down over the frame 18, as in Fig. 9, runners 74 carried on the bottom of the frame 17 can slide therein, whereby to facilitate sliding the one bed frame over the other, while allowing sufficient clearance between the parts to avoid any danger of something catching and interfering with the easy operation. Strips 75 inside the trailer body 12 on opposite sides of the aisle 76 provide a convenient place on which to rest a folded table 77 in upside down position. The top supporting frame 78 of this table carries rollers 79 on the opposite sides thereof which project above the plane of the table in this position sufficiently to provide an anti-friction roller support for the bed frame 18 in moving it in either direction to or from the extended position shown in Fig. 7. This bed frame in its retracted position rests at opposite ends on top of the cabinets 80 provided on opposite sides of the aisle 76, while the table 77, of course, provides support for the middle of the frame since the frame rests on the rollers 79 thereof. Two sheet metal brackets 81 are secured to the side walls of the body 12 on the inside thereof on opposite sides of the beds 17—18, as best appears in Fig. 8. Rollers or pins 82 fixed to the opposite sides of the bed frame 17 are arranged to be movable under these brackets 81 or to be engaged on the ledge 83 on the inner ends of said brackets, from which points they may ride up the inclined upper edges 84 onto the ledges 85 which are approximately in the same horizontal plane with the guides 73 on the bed frame 18, whereby to facilitate stacking the beds on top of one another.

The operation of the beds to and from extended operative position is as follows: Assuming the beds are in extended position as in Fig. 7, in order to close the trailer to make ready for the road, the bed frame 17 is first pushed inwardly far enough to make the rollers 82 clear the inner ends of the brackets 81 whereupon the outer end of the frame 17 can be lowered and the frame pulled out to engage the rollers 82 on the ledge 83. Then, by pulling the frame 17 out farther, the rollers 82 will ride up the inclines 84 until they ride onto the ledges 85 on top of the brackets 81, thus elevating the inner end of the frame 17 sufficiently to permit sliding it on top of the frame 18. The outer end of the frame 17 can then be permitted to rest on the ground, as indicated in the dotted line position shown in Fig. 7, while the operator goes to the other side of the trailer and pushes the bed frame 18 inwardly to the dotted line position shown in Fig. 7, whereupon, assuming the frame 18 has been locked in place in the manner hereinafter described, the frame 17 can be slid inwardly on the guides 73 into retracted position on top of the frame 18 and similarly locked in place. It was previously described how the side closures 21 are folded down onto the top of the bedding in the frames 17 and 18 so as to prepare these frames for this stacking operation. In setting the trailer up for use, the procedure is reversed, the frame 17 being first of all slid outwardly on the guides 73 until the rollers 82 come to rest on the ledges 85 whereupon the other frame 18 can be slid outwardly to its fully extended position. Then the frame 17 can be pushed inwardly far enough to have the rollers 82 ride off the inner ends of the brackets 81 whereupon the frame 17 can be slid outwardly to its operative position. The table 77 serves as a bridge between the cabinets 80 and as a mounting for anti-friction rollers 79 whereby to provide a continuous supporting surface for the bed frame 18 in its movement into and out of the trailer body while the rollers, of course, make for reduced friction so as to facilitate movement. It is evident how little the construction and operation would be affected by placing the beds lengthwise in the trailer and extending them sidewise to operative position.

When the bed frames 17 and 18 are extended, the props 19 previously mentioned are swung downwardly about the clamps 20 as centers and are clamped in bed supporting position. The slots 86 in the props 19 permit the same to be moved endwise relative to the clamps 20 so that the ends of the props may be engaged in slots 87 in the side walls 88 of the cabinets 80 inside the trailer body 12, as illustrated in Fig. 9. In that way, the props 19 are made to serve an additional function, namely, that of interlocking the bed frames with the trailer body to prevent endwise movement of the bed frames from retracted position. When the bed frames are locked in this manner against endwise movement they cannot drift into contact with the side doors 14 and 15 and impose undue pressure thereon. At a previous point in the description reference was made to the use of foldable props for the four corners of the trailer body when uncoupled from the car; a similar type of prop to the props 19 would be suitable for that purpose since the same may be clamped securely enough for the purpose intended and may be readily loosened and folded up into an out-of-the-way position.

When the trailer is collapsed and folded ready for the road, the top 13 provides adequate protection for the trailer body and contents inasmuch as the strips 66 on the front and rear ends depend far enough to seal the end joints. Other strips 66' depend from the top 13 on opposite sides and overlap the sides of the trailer as well as the doors 14 and 15 in their closed position in the manner indicated in Fig. 10, whereby to further seal the trailer body at the side joints between the top and body and, at the same time, lock the doors 14 and 15 securely in closed position so that they do not rely entirely upon the window sash fasteners 89 provided in connection therewith. At the same time, sponge rubber sealing strips 90 may be provided along the sides of the trailer and on the doors 14 and 15 which, when the top is lowered, will be compressed to effect a more perfect seal to exclude dust and dirt. If desired, such sealing strips may be provided on all four sides of the trailer body for compression by the strips 66 and 66' when the top 13 is lowered.

The awnings or canopies over the beds 17 and 18 are arranged to be hooked detachably to the inside of the top 13, as indicated at 91 in Fig. 7, rods 92 and 93 being provided along the top edge and at an intermediate point of the awning to reenforce the same and facilitate assembling in the manner indicated. The rods 92 will serve as a place for mounting eyelets 94 to engage the hooks 91 while the rods 93 may be arranged to engage in notches 95 in the upper corners of the side closures 21 to brace the closures 21 in their raised operative position and at the same time support the awnings.

It is believed the foregoing description conveys a good understanding of the objects and advantages of my invention. The appended claims have been drawn with a view to covering all legitimate modifications and adaptations.

I claim:

1. In a trailer of the class described, the combination of a body having side walls, a top raisable off the top of said side walls, side enclosures hinged to the top of said side walls to swing upwardly into operative position extending between said body and said top in the latter's raised position, posts supporting said top for up and down movement relative to said body, means for raising said posts relative to said body, and coiled tension springs connecting said enclosures and said top for automatically swinging the enclosures upwardly relative to the body when the top is being raised.

2. In a trailer of the class described, the combination of a body portion having side walls, a top portion raisable off the top of said side walls, side enclosures hinged to one of said portions to swing upwardly into operative position extending between said body and said top in the latter's raised position, posts supporting said top for up and down movement relative to said body, means for raising said posts relative to said body, a flexible connection between each of said enclosures and the other of said first two named portions for automatically swinging the enclosures into upright position when the top is being raised, rollers carried on the outer ends of said enclosures arranged to ride on surfaces provided therefor on the last named portion to raise the top independently of said post-raising means when said enclosures are swung toward vertical positions, and means providing interengageable surfaces on said side enclosures and the last named portion for lifting said top off said rollers at the limit of movement of said side enclosures.

3. In a trailer of the class described, the combination of a body portion having side walls, a top portion raisable off the top of said walls, side enclosures hinged to one of said portions to swing upwardly into operative position extending between said body and said top in the latter's raised position, rollers carried on the outer ends of said enclosures arranged to ride on surfaces provided therefor on the other of said first two named portions to raise the top when said enclosures are swung toward vertical positions, and means providing interengageable surfaces on said side enclosures and the last named portion for lifting said top off said rollers at the limit of movement of said side enclosures.

4. In a trailer of the class described, the combination of a body portion having side walls, a top portion raisable off the top of said side walls, side enclosures hinged to one of said portions to swing upwardly into operative position extending between said body and said top in the latter's raised position, resilient means tending normally to swing said enclosures toward vertical operative position, rollers carried on the outer ends of said enclosures arranged to roll on surfaces provided therefor on the other of said first named portions to raise the top when said enclosures swing toward vertical positions, and means providing interengageable surfaces on said side enclosures and the last named portion for lifting said top off said rollers at the limit of movement of said side enclosures.

5. A trailer as set forth in claim 1, wherein each spring is attached at one end to the side enclosure approximately midway intermediate the top and bottom edges thereof, and is attached at its other end to an adjacent portion of said top so that the spring pull is outward on the enclosure as the top is raised.

6. In a vehicle of the character described, comprising a body having a movable portion adapted to be operated by cables attached thereto, a combination spare wheel and tire carrier and cable winding drum structure comprising a support carried on said body, a drum rotatably mounted on said support and adapted to have the cables wound on opposite ends thereof in opposite directions, a shaft for turning the drum, pawl and ratchet means for locking the drum releasably in adjusted position, and a spare wheel demountably secured upon the shaft and so arranged whereby it provides a convenient manually rotatable means for turning the shaft and drum.

7. In a vehicle of the character described comprising a body having a movable portion adapted to be operated by cables attached thereto, a combination spare wheel and tire carrier and cable winding drum structure comprising a support carried on said body, a drum rotatably mounted on said support and adapted to have the cables wound on opposite ends thereof in opposite directions, a shaft for turning the drum, pawl and ratchet means for locking the drum releasably in adjusted position, crank engageable projections on the outer end of said shaft for rotating the shaft and drum, and a spare wheel demountably secured upon the outer end of said shaft in proximity to said crank engageable projections, whereby the shaft and drum are rotatable selectively by means of a crank engaged on said projections or by manual rotation of the spare wheel, said spare wheel having a hub cap thereon enclosing the outer end of said shaft so as to conceal said crank engageable projections.

8. In a trailer, the combination of a body, vertically movable posts at opposite ends thereof, a raisable top supported on the upper ends of said posts, a plurality of flexible cables wound at one end thereof on a single manually rotatable drum rotatably supported on said body, said cables extending from the drum over pulleys on the body and connected with the lower ends of said posts to raise the same when the cables are wound upon the drum, a shaft for turning the drum, pawl and ratchet means for locking the drum releasably in adjusted position, foldable side enclosures for said body hinged to the body so as to be raisable into operative position between the body and the top in raised position, and coiled tension springs connected between the top and said enclosures for raising the latter simultaneously with the top in the raising of the latter.

9. In a trailer, the combination of a main body portion having side walls, a separate top raisable from a lower retracted position covering the body to an elevated position relative to the body, two oppositely extensible wing portions for said body disposed in superimposed relation in said body and movable laterally in opposite directions through openings provided in the opposite side walls, means for supporting said wing portions in a common plane in extended position relative to said body, means for elevating one wing portion from said plane when the other wing portion is moved to retracted position to permit superimposing the same on the other wing portion in moving it in retracted position, and means for retaining said wing portions in retracted position in said body when the top is lowered onto said body.

10. In a trailer, the combination of a main body portion having side walls with doors hinged at their lower edges to swing outwardly from substantially vertical closed position, a top raisable off the body independently of said doors to an elevated position parallel to the body, one or more extensible wing portions for said body normally disposed in the body behind said doors but adapted to be extended from the body to operative position when the doors are swung outwardly, and side members on the top arranged to overlap the outside of the upper ends of said doors in their closed position when the top is lowered onto the body, whereby to prevent accidental opening of said doors.

11. In a trailer, the combination of a main body portion having side walls with doors hinged at their lower edges to swing outwardly from substantially vertical closed position, one or more extensible wing portions for said body normally disposed within the body behind said doors but adapted to be extended from the body to operative position, a top raisable off the body independently of the doors, foldable props for supporting said wing portions in operative position, the same being foldable alongside the wing portions in the retracted positions thereof, keeper means in the body engageable detachably by said props to lock said wing portions releasable in retracted position, and means for releasably securing the doors in closed position with the top in lowered position.

12. In a trailer, the combination of a main body portion having opposed side walls with openings provided therein, a pair of extensible wing portions disposed in said body in superimposed relation and slidable relative to one another through the openings to operative positions disposed in a common plane and projecting from opposite sides of the body, means for elevating one wing portion from said plane when the other wing portion is moved to retracted position to permit superimposing the same on the other wing portion in moving it to retracted position, and guides on top of one of the wing portions cooperating with runners on the bottom of the other wing portion to facilitate sliding movement of the latter relative to the former to and from retracted superimposed relation.

13. In a trailer, the combination of a main body portion having opposed side walls with openings provided therein, a pair of extensible wing portions disposed in said body in superimposed relation and slidable relative to one another through the openings to operative positions disposed in a common plane and projecting from opposite sides of said body, said extensible wing portions having upright side members, foldable side enclosures hinged thereto to fold inwardly on top thereof, means for elevating one wing portion from said plane when the other wing portion is moved to retracted position to permit superimposing the same on the other wing portion in moving it to retracted position, guide strips carried on the outer sides of the foldable side enclosures on one of said extensible wing portions, and runners carried on the bottom of the other extensible wing portion for slidable engagement on said guide strips.

14. In a trailer, the combination of a main body portion having side walls, and a side door in one of said walls, an extensible wing portion for said body disposed normally in said body but arranged to slide through the door opening to a position projecting from the body, means for supporting said wing portion in such position, a raisable top for the body, means for retaining said wing portion in retracted position in said body when the top is lowered onto said body, a pair of foldable side enclosures hinged to the opposite sides of the extensible wing portion to swing upwardly to operative position, and a flexible covering extending upwardly from the wing portion between the outer ends of the last named side enclosures and inwardly to the raisable top, said covering having a cross-piece engaging the outer ends of the last named side enclosures for releasably securing the same in raised operative position.

15. A trailer as set forth in claim 14, wherein the means for supporting the extensible wing portion in extended position comprises one or more foldable props on the outer end of the wing portion extensible downwardly therefrom to engage the ground beneath the wing portion in extended position, said props being foldable into a position alongside the wing portion in the retracted position thereof inside the body, said trailer including keeper means in the body detachably engaged by one or more of said props for releasably securing the wing portion in retracted position in the body.

16. A trailer comprising a main body portion having side walls, two extensible wing portions normally disposed in superimposed relation inside the body but adapted to be extended from opposite sides of the body, said body having openings in the walls thereof for movement of the extensible wing portions to and from extended position, means inside the body slidably supporting one of said wing portions, guides on the top of the last named wing portion for slidably supporting the other wing portion thereon, said wing portions in their extended positions being disposed substantially in the same horizontal plane, and elevating means on the wall of the body adjacent one of the aforesaid openings arranged to be detachably engaged by the inner end of the last named wing portion to raise the same sufficiently to permit movement of the first named wing portion therebeneath to retracted position, whereby to permit sliding of the other wing portion on top of it.

17. In a trailer, the combination of a main body portion having opposed side walls with openings provided therein, movable body portions normally disposed in superimposed relation in said body but adapted to be extended one from one side and the other from the opposite side of said body through said openings, means for supporting the movable body portions in a common plane in their extended positions, one of said movable body portions having oppositely extending lateral projections, and said main body portion having means providing inclined surfaces adapted to be slidably engaged by said projections to elevate the inner end portion of said movable body portion to a plane above the same, whereby to permit superimposing the elevated movable body portion on the other movable body portion when the movable body portions are moved to retracted position in the main body portion.

18. In a trailer, the combination of a main body portion having opposed side walls with openings provided therein, movable body portions normally disposed in superimposed relation in said body but adapted to be extended one from one side and the other from the opposite side of said body through said openings, beds carried in and movable with said body portions, means for supporting the movable body portions in a common plane in their extended positions, one of said movable body portions having oppositely extending lateral projections, and said main body portion having means providing inclined surfaces adapted to be slidably engaged by said projections to elevate the inner end portion of said movable body portion from the plane of the other movable body portion to a plane above the same, whereby to permit superimposing the elevated movable body portion on the other movable body portion when the movable body portions are moved to retracted position in the main body portion, and means for slidably guiding the elevated movable body portion on top of the other movable body portion independently of the main body portion and the beds carried in said movable body portions.

19. In a trailer, the combination of a main body portion having opposed side walls with openings provided therein, movable body portions normally disposed in superimposed relation in said body but adapted to be extended one from one side and the other from the opposite side of said body through said openings, beds carried in and movable with said body portions, means for supporting the movable body portions in a common plane in their extended positions, one of said movable body portions having oppositely extending lateral projections, and said main body portion having means providing inclined surfaces adapted to be slidably engaged by said projections to elevate the inner end portion of said movable body portion from the plane of the other movable body portion to a plane above the same, whereby to permit superimposing the elevated movable body portion on the other movable body portion when the movable body portions are moved to retracted position in the main body portion, longitudinal side members hingedly mounted on the opposite sides of both of said movable body portions and movable upwardly from folded horizontal positions when the movable body portions are extended from the main body portion, and longitudinal guides for the elevatable movable body portion provided on the outer side of said hinged side members on the other movable body portion for slidably guiding the elevated movable body portion independently of the main body portion and the beds carried in said movable body portions.

FRANK F. KORS.